United States Patent
Gentelet et al.

(10) Patent No.: US 9,053,377 B2
(45) Date of Patent: Jun. 9, 2015

(54) DEVICE AND METHOD FOR THE AUTOMATED READING/WRITING OF RFID TAGS

(75) Inventors: Franck Gentelet, Guyancourt (FR); Jean-Clement Bouveresse, Sannois (FR)

(73) Assignee: IER, Sureness (FR)

( * ) Notice: Subject to any disclaimer, the term of this patent is extended or adjusted under 35 U.S.C. 154(b) by 99 days.

(21) Appl. No.: 13/822,901

(22) PCT Filed: Mar. 7, 2011

(86) PCT No.: PCT/FR2011/050468
§ 371 (c)(1),
(2), (4) Date: Mar. 13, 2013

(87) PCT Pub. No.: WO2012/025675
PCT Pub. Date: Mar. 1, 2012

(65) Prior Publication Data
US 2013/0241700 A1  Sep. 19, 2013

(30) Foreign Application Priority Data
Nov. 2, 2010  (FR) .................................... 10 59020

(51) Int. Cl.
*H04Q 5/22* (2006.01)
*G06K 7/10* (2006.01)
*H01Q 17/00* (2006.01)
*G06Q 50/28* (2012.01)
*H01Q 1/22* (2006.01)
*G06K 7/00* (2006.01)

(52) U.S. Cl.
CPC .......... *G06K 7/10009* (2013.01); *H01Q 17/001* (2013.01); *G06Q 50/28* (2013.01); *H01Q 1/2216* (2013.01); *H01Q 1/2208* (2013.01); *G06K 7/0008* (2013.01); *G06K 7/10128* (2013.01); *G06K 7/10217* (2013.01); *G06K 7/10316* (2013.01)

(58) Field of Classification Search
CPC . H01Q 1/2216; H01Q 17/001; H01Q 1/2208; G06Q 50/28
USPC ......................................................... 340/10.1
See application file for complete search history.

(56) References Cited

U.S. PATENT DOCUMENTS

| | | | |
|---|---|---|---|
| 7,528,726 B2 * | 5/2009 | Lee et al. .................... | 340/572.7 |
| 8,159,330 B2 * | 4/2012 | Braun .......................... | 340/10.1 |
| 8,502,646 B2 * | 8/2013 | Sano et al. .................. | 340/10.1 |
| 2002/0024441 A1 | 2/2002 | Terashima | |
| 2002/0139617 A1 | 10/2002 | Goodwin | |
| 2002/0145037 A1 | 10/2002 | Goodwin | |
| 2008/0094178 A1 * | 4/2008 | Angerer ...................... | 340/10.1 |
| 2008/0249883 A1 | 10/2008 | Daily | |

FOREIGN PATENT DOCUMENTS

EP  1717772    11/2006
EP  1717772 A1 * 11/2006

* cited by examiner

*Primary Examiner* — Brian Zimmerman
*Assistant Examiner* — Sara Samson
(74) *Attorney, Agent, or Firm* — Greer, Burns & Crain, Ltd.

(57) ABSTRACT

A device is provided for reading/writing RFID tags, and includes a so-called pre-defined reading site, on/in which at least one object bearing an RFID tag is to be placed; at least one RFID antenna; and at least one RFID reader co-operating with the RFID antenna; the at least one RFID antenna being arranged in such a way as to read the at least one RFID tag of the at least one object placed on/in the reading site. A method for reading RFID tags is also provided.

13 Claims, 2 Drawing Sheets

DEVICE AND METHOD FOR THE AUTOMATED READING/WRITING OF RFID TAGS

FIELD OF THE INVENTION

The present invention relates to a device for the automated reading/writing of RFID tags. It also relates to a method for reading/writing such tags.

The field of the invention is the field of RFID tag reading devices that are not held during use, and more particularly terminals or units for reading RFID tags arranged on objects.

BACKGROUND OF THE INVENTION

RFID tags are currently in common use for identifying, tracking and managing objects. Systems using RFID technology enable more reliable, faster automatic management of objects in a number of fields.

With the use of RFID tags comes the need for devices reading RFID tags. More particularly, with the use of RFID tags in commerce for the sale of products comes the need for automatic or semi-automatic reader terminals that can be used directly by consumers.

Portable, wireless RFID tag reading devices currently exist that can be used to read RFID identification data from an RFID tag. In order to read an RFID tag, the reading device must be held and pointed towards the object bearing the RFID tag; this must be done for each object bearing an RFID tag, which requires significant handling time.

Non-portable RFID tag reading devices also exist that comprise one or more RFID antennae. Said devices are usually in the form of a "reading cage", also known as a "reading tunnel", through which all of the objects bearing an RFID tag must pass, for example on a conveyor belt. This type of device requires conveyance means, such as a conveyor belt, on which a reading cage is arranged. Furthermore, a conveyor belt is required that is sufficiently long for the objects to be deposited upstream of the reading cage and to be retrieved downstream of the reading cage. Such an assembly, comprised of such a conveyor belt and a cage reader, takes up a lot of space. Furthermore, it is often necessary to deposit the objects one by one on the conveyor belt to improve the reading of each of the RFID tags and due to the dimensions of the cage reader, which also requires numerous handling operations.

A purpose of the present invention is to remedy the aforementioned drawbacks.

Another purpose of the invention is to propose a small RFID tag reading/writing device that reads RFID tags borne by objects without any handling of said objects.

Finally, a further purpose of the invention is to propose a small RFID tag reading/writing device that is not held during use, while providing correct reading of the objects bearing RFID tags.

SUMMARY OF THE INVENTION

The invention proposes to achieve the aforementioned aims with an RFID tag reading/writing device comprising:
- a so-called pre-defined reading site, on/in which at least one object bearing an RFID tag is to be placed,
- at least one RFID antenna, and
- at least one RFID reader co-operating with said RFID antenna, said at least one RFID antenna being arranged in such a way as to read said at least one RFID tag of said at least one object placed on/in said reading site.

In the device according to the invention, the reading site is directly accessible by the user. The device according to the invention does not require any conveyance means such as a conveyor belt to bring the objects bearing RFID tags to the reading site.

Thus, the device according to the invention has a reading site capable of receiving the objects bearing RFID tags to be read/written. Such a predefined site makes it possible to optimise the positioning of the at least one RFID antenna to optimise the reading/writing of the RFID tags borne by the objects deposited on/in this site, and thus ensure correct reading/writing of said RFID tags.

In addition, as the positioning of the at least one antenna can be optimised around or on/in the predefined reading site, it is possible to read/write several RFID tags on several objects without having to handle them separately.

Furthermore, the device according to the invention proposes a predefined site on/in which the objects can be deposited directly by the consumer without the use of a conveyor belt or more generally any conveyance means whatsoever. Thus, the device according to the invention has smaller dimensions and takes up less space than the devices of the prior art comprising a conveyor belt.

Advantageously, the device according to the invention can comprise mechanical means for modifying the orientation of the at least one object placed on/in said reading site.

Thus, the orientation of the objects bearing the RFID tags present on/in the reading site is modified, which makes it possible to modify the orientation of the RFID tags and improve the reading/writing of the RFID tags.

In a particular embodiment, the mechanical means can comprise a mobile tray. The mobile tray can be arranged at the bottom of the reading site. The mobile tray can, for example, translate freely along one or more axes and/or rotate freely about one or more axes, and be moved mechanically by one or more motors.

In an advantageous version, the device according to the invention can comprise weighing means providing a signal relating to the total weight of the objects present on/in the reading site, said signal modifying the power of the signal emitted by said at least one RFID antenna.

Thus, the device according to the invention makes it possible to adapt the power of the RF signal emitted by the at least one RFID antenna as a function of the weight of all of the objects, the RFID tags of which are to be read/written.

Thus, the device according to the invention makes it possible to use sufficiently powerful waves appropriate to the number of RFID tags located on the reading site, while making it possible to:
- limit interference with other reading systems, and
- prevent the reading of other tags that are not on/in the reading site.

This feature of the device according to the invention is particularly advantageous when all of the objects have a substantially similar, known weight. In this case, the total weight measured can be used to determine the number of objects and therefore RFID tags present in/on the reading site and thus modify the power of the reading/writing signal as a function of said number.

The weighing means can comprise at least one set of scales arranged at the bottom of the reading site.

In a particular embodiment, the weighing means constitute at least partially the mechanical means for modifying the orientation of the at least one object arranged on/in the reading site. For example, when the mechanical means for modifying the orientation of the at least one object arranged on/in the reading site comprise a mobile tray and the weighing means comprise a set of scales, the mobile tray can be the tray of the scales.

Advantageously, the device according to the invention can also comprise insulating means arranged around at least one part of the reading site and the at least one reading antenna in order to limit the propagation of waves outside the reading site and, if applicable, the propagation of external waves towards the reading site. Thus, the device according to the invention makes it possible to improve the reading/writing of the RFID tags by limiting interference. Consequently, it is possible to arrange several RFID tag reading devices in a small space.

In a particular embodiment, the insulating means can comprise a foam that is insulating at the frequency of the waves emitted by the at least one RFID reading/writing antenna. An example of insulating foam is C-RAM LF, marketed by Cumming Microwave.

The device according to the invention can also comprise means of detecting the presence or depositing of at least one object on/in the reading site. These presence detection means can be arranged to transmit a signal that triggers the activation and/or deactivation of the emission of RF reading/writing signals by the at least one RFID antenna.

According to a particular embodiment, the presence detection means can comprise one or more infra-red sensors arranged around/in/on the reading site.

According to another embodiment, the detection means can at least partially comprise the weighing means. Thus, when the weight measured by the weighing means on the reading site varies or is greater than a previously determined weight, this can signify the presence of objects bearing RFID tags on the reading site.

The device according to the invention can comprise, in a particular version, between one and four RFID antennae oriented substantially towards a predetermined geographical centre of the reading site.

In a particular version of the device according to the invention, the reading site can be in the form of an opening comprising two side walls and a rear wall surrounding said opening and being higher than said opening.

The opening can be arranged substantially at an average height of a consumer to facilitate the depositing of the objects or a bag containing the objects in the opening.

Still in this particular version of the device according to the invention, and when the device according to the invention comprises four RFID antennae:
   one antenna can be arranged in the middle of each side wall of the opening and above said opening, each antenna being oriented at an angle of 15° downwards and towards said opening, and
   two antennae can be arranged at the front of the opening and below said opening, each antenna being oriented at an angle of 15° upwards and towards said opening.

According to another aspect of the invention, a collection device is proposed, comprising:
   a tag reading/writing device according to the invention, and automatic payment means.

The automatic payment means can be arranged to co-operate directly or indirectly with the reading device in order to perform automatic collection.

Furthermore, the automatic payment means can be built into the reading/writing device according to the invention.

According to a further aspect of the invention, a method is proposed for reading RFID tags by at least one antenna implementing the device according to the invention, each of said tags being borne by an object, characterised in that it comprises a variation or determination of the reading power as a function of the total weight of said objects.

The method according to the invention can also comprise, prior to a reading/writing step, a step of measuring the total weight of the objects bearing the RFID tags to be read/written and the generation of an electrical signal the power of which is calculated as a function of the total weight measured and, if applicable, an average weight per object.

The method according to the invention can also comprise a mechanical modification of the orientation of at least one object bearing an RFID tag during reading.

The method according to the invention can be utilised for the automatic collection of payment for objects bearing RFID tags and more particularly objects each weighing substantially the same as each other.

BRIEF DESCRIPTION OF THE DRAWINGS

Other advantages and characteristics of the invention will become apparent on examination of the detailed description of an embodiment, which is in no way limitative, and the attached drawings, in which.

DETAILED DESCRIPTION OF THE INVENTION

In the figures and hereafter, components common to several figures retain the same reference.

Figure 1:
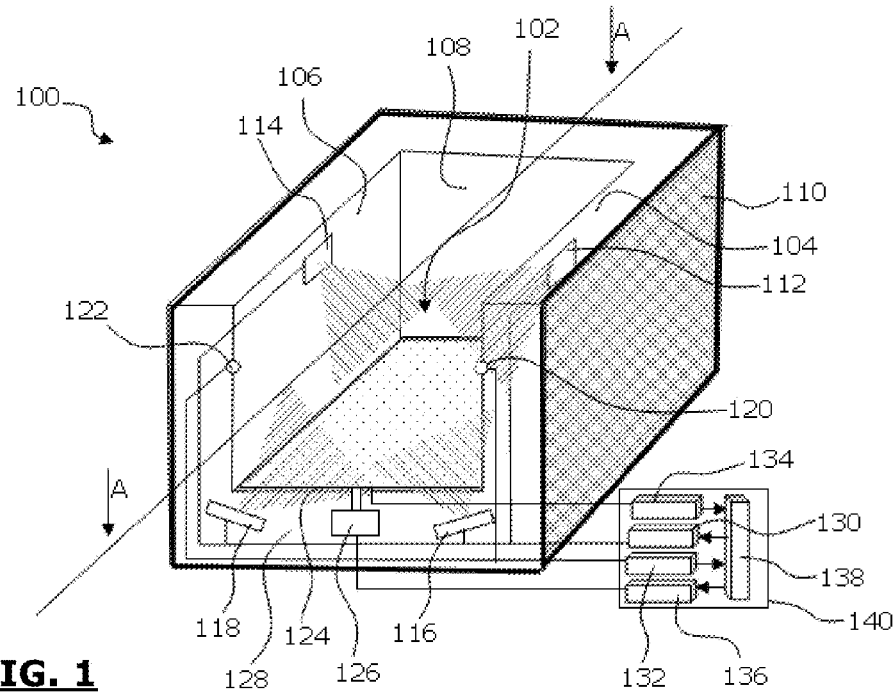
FIGS. 1-3 are diagrammatic representations of different views of an embodiment of a device according to the invention.
Figure 2:
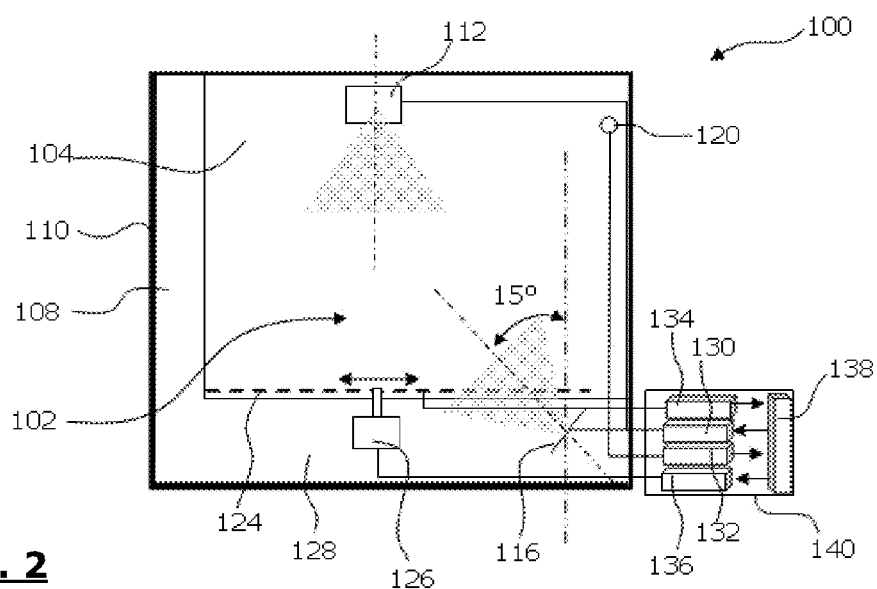
Figure 3:
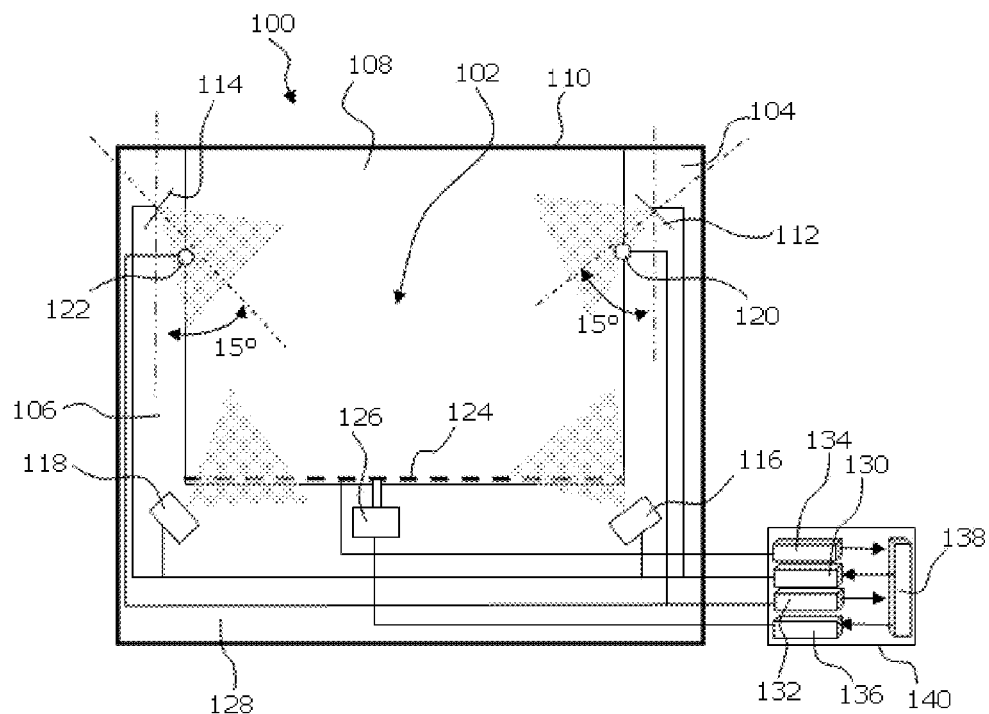

FIGS. 1-3 are diagrammatic representations of different views of a device 100 according to the invention.

FIG. 1 is an isometric view of the device 100, FIG. 2 is a cross-section along the plane AA and FIG. 3 is a front view.

The device 100 comprises an opening 102 forming a reading/writing site capable of receiving objects each bearing an RFID tag. The reading/writing site 102 is accessible to the user, who directly deposits all of the objects on said site without having to handle them one by one.

The device 100 comprises two side walls 104 and 106 and a rear wall 108 around the reading/writing site 102. The device 100 does not have a wall in front of or above the reading/writing site in order to enable a consumer to deposit the objects bearing RFID tags easily. Furthermore, as it does not have a top wall, the reading/writing device can be used to read/write tall objects.

The device 100 comprises an insulating jacket/layer 110 made from an insulating foam and arranged to limit interference between the waves in the opening and external waves. This layer 110 is arranged in the thickness of all of the walls of the till.

The device 100 comprises on each side wall 104 and 106 an RFID antenna, 112 and 114 respectively. The antennae 112 and 114 are arranged in the top part of the side walls 104 and 106, raised in relation to the reading/writing site 102 and substantially in the middle of said walls 104 and 106.

Two other antennae 116 and 118 are arranged at the front, below the reading/writing site 102.

All of the RFID antennae 112-118 are oriented towards the reading/writing site 102. Thus, all of the antennae are inclined by 15° towards the reading site in relation to a vertical axis passing through the centre of the antennae 112-118.

The device 100 also comprises two presence detector cells 120 and 122 arranged on the side walls 104 and 106, at the front of said walls, to detect the depositing on/in and removal from the reading/writing site 102 of objects bearing RFID tags.

Furthermore, a set of scales shown diagrammatically by a tray 124 in FIGS. 1-3 is positioned at the bottom of the reading/writing site and arranged to take measurements.

The tray 124 of the scales is moreover movably mounted and can be moved by motor means 126 arranged in the bottom wall 128 of the device 100.

The RFID antennae 112-118 are connected to an RFID module 130 providing the signal to be emitted by the antennae 112-118 and receiving and processing the signal received by each of the antennae 112-118.

Similarly, the detector cells 120 and 122 are connected to a detection module 132, the scales 124 are connected to a weighing module 134 and the motor means 126 are connected to a movement control module 136.

All of the modules 130-136 are connected to a central module 138 receiving data transmitted by the detection module 132 and the weighing module 134 in order to control the RFID module 130 and the movement control module 136.

When a consumer deposits objects on the reading site 102, the detector cells 120, 122 detect the presence of objects on the reading site 102 and transmit this information to the detection module 132, which alerts the central module 138. The central module 138 activates the RFID module 130 with a view to reading/writing the RFID tags on the objects deposited on the reading site. The weighing module 134 transmits the total weight of the objects present on the reading/writing site. As a function of the total weight of the objects, the central module 138 transmits a signal power set point to the RFID module 130. The RFID module 130 generates an electrical signal of the corresponding power and sends it to the RFID antennae 112-118. If needed, the central module 138 also transmits a set point to the movement module 136 so that the tray 124 is moved in order to change the orientation of the objects present on the reading site 102. The movement module 136 activates and deactivates the motor means 126 as a function of the set point(s) received from the central module 138.

When the consumer removes the objects from the reading site 102, the detector cells 120-122 detect the removal of the objects and transmit the information to the detection module 132, which alerts the central module 138. When it receives this information, the central module 138 deactivates the RFID module 130.

All of the modules can be arranged in a single housing 140. This housing, which is shown diagrammatically in FIGS. 1-3, can be arranged in the thickness of an external surface of one of the walls of the device 100.

The RFID antennae 112-118 can be arranged in the thickness of the walls of the device near the internal surface of these walls, i.e. the surfaces of the walls on the side of the reading/writing site 102.

The device 100 can also comprise a layer (not shown) made from a soft material arranged on the tray 124 so that when the tray is moved, the objects on the tray are not damaged.

The device 100 can be utilised in an automatic collection device also comprising automatic payment means such as payment by bank card or loyalty card or in cash.

Figure 4:
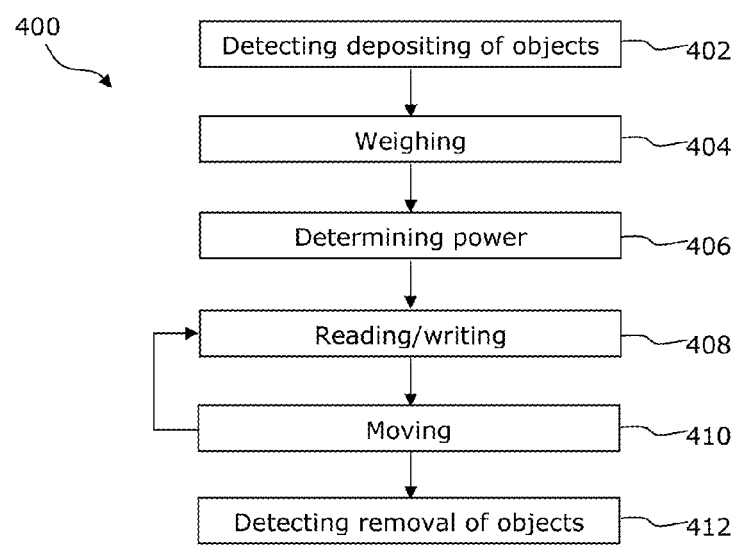
FIG. 4 is a diagrammatic representation of a method according to the invention.

FIG. 4 is a diagrammatic representation of a method 400 for reading RFID tags according to the invention.

The method 400 comprises a first step 402 of detecting the depositing of one or more objects on/in the reading/writing site.

In step 404, the total weight of the objects deposited on the reading site is measured.

As a function of the total weight, a power of the radio-frequency signal to be generated is determined in step 406.

In step 408, a radio-frequency signal of the corresponding power is generated and emitted by the RFID antennae and a reading/writing operation is performed.

If necessary, the objects are moved during a step 410 performed either during the reading/writing step 408 or alternately with the reading/writing step 408 until all of the RFID tags have been read/written.

When the user removes the objects, a step 412 of detecting the removal of the objects brings the method to an end.

The method 400 can be utilised in an automatic collection method also comprising one or more automatic payment steps.

Of course, the invention is not limited to the examples that have just been described.

The invention claimed is:

1. A device for reading/writing RFID tags comprising:
a pre-defined reading site, on which at least one object carrying an RFID tag is to be placed;
at least one RFID antenna;
at least one RFID reader co-operating with said RFID antenna, said at least one RFID antenna being arranged in such a way as to read said at least one RFID tag of said at least one object placed on the reading site; and
weighing means providing a first signal relating to the total weight of the at least one object present on/in the reading site, the first signal modifying the magnitude of the reading power of a second signal emitted by the at least one RFID antenna as a function of the total weight of the at least one object.

2. The device according to claim 1, further comprising mechanical means for modifying the orientation of the at least one object placed on/in the reading site.

3. The device according to claim 2, wherein the weighing means constitute at least partially the mechanical means for modifying the orientation of the at least one object placed on/in the reading site.

4. The device according to claim 1, further comprising insulating means arranged around at least one part of the reading site and at least one reading antenna in order to limit the propagation of waves outside the reading site.

5. The device according to claim 4, wherein said insulating means comprises a foam which is insulating at the frequency of the waves emitted by the at least one reading antenna.

6. The device according to claim 1, further comprising means for detecting the presence or deposit of at least one object on/in the reading site.

7. The device according to claim 1, further comprising between one and four RFID antennae orientated substantially towards a geographical centre of the reading site.

8. The device according to claim 1, wherein the reading site is in the form of an opening comprising two side walls and a rear wall surrounding said opening and being higher than said opening.

9. The device according to claim 7, wherein:
one antenna is placed in the middle of each side wall of the opening and above said opening, each antenna being orientated at an angle of 15° downwards and in the direction of said opening; and
two antennae are placed in the front of the opening and below said opening, each antenna being orientated at an angle of 15° upwards and in the direction of said opening.

10. The device according to claim 1 further comprising: automatic payment means.

11. A method for reading RFID tags by at least one antenna comprising:
  placing at least one object carrying an RFID tag on/in a predefined reading site;
  reading the at least one RFID tag with at least one RFID reader co-operating with at least one RFID antenna;
  providing a first signal relating to the total weight of the at least one object present on/in the reading site; and
  modifying the magnitude of the power of a second signal emitted at least one RFID antenna base on the first signal;
  wherein the modification of the magnitude of the power of the second signal is function of the total weight of said objects.

12. The method according to claim 11, further comprising a mechanical modification to the orientation of at least one object bearing an RFID tag during the reading.

13. The method according to claim 11 further comprising: automatically collecting payment.

* * * * *